Figure 5:
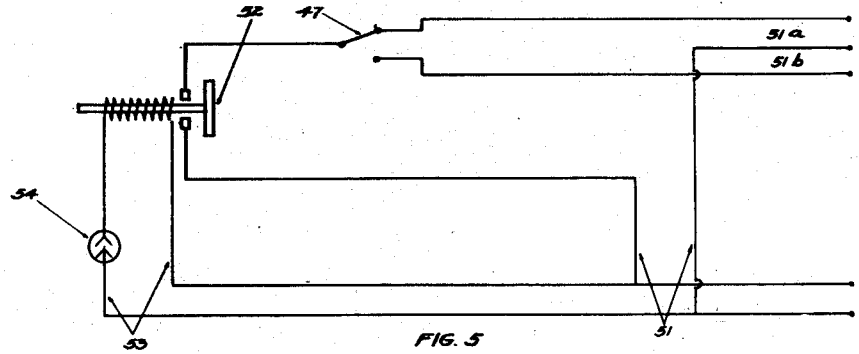

April 22, 1924.
W. MALM
1,491,017
MOTION PICTURE FILM FRAMING DEVICE FOR MOTION PICTURE MACHINES
Filed May 15, 1922    2 Sheets-Sheet 1
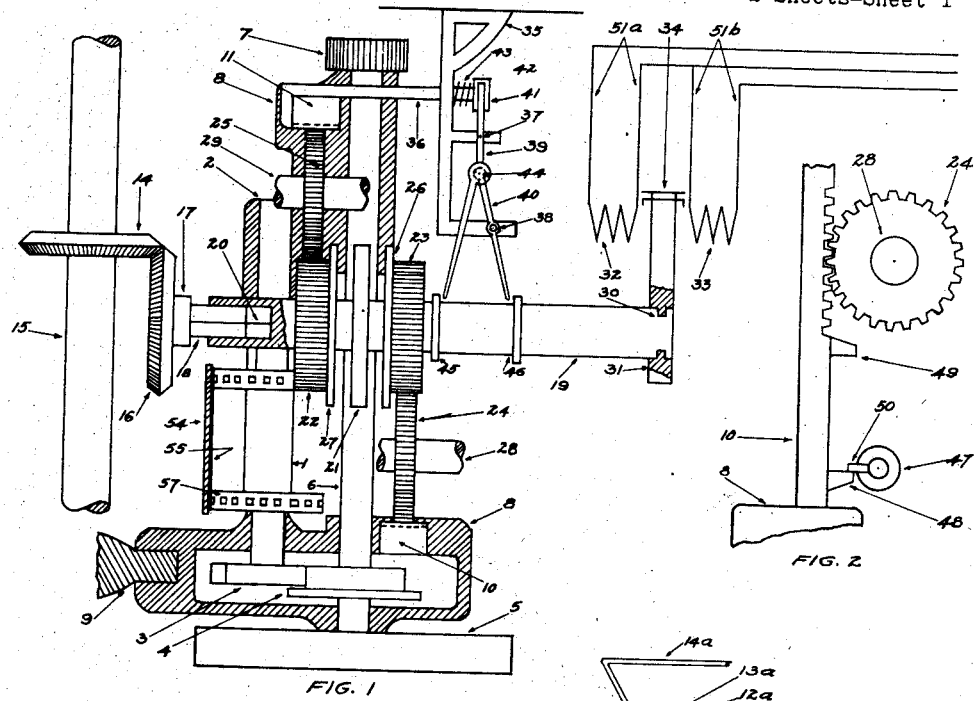
FIG. 1
FIG. 2
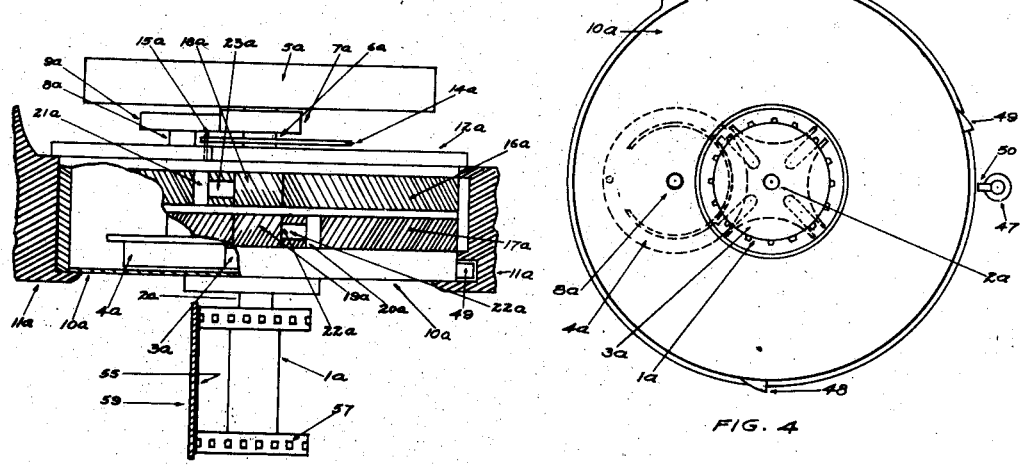
FIG. 3
FIG. 4
WITNESS:
INVENTOR.
William Malm April 22, 1924.

W. MALM 1,491,017

MOTION PICTURE FILM FRAMING DEVICE FOR MOTION PICTURE MACHINES

Filed May 15, 1922    2 Sheets-Sheet 2

WITNESS:

INVENTOR.

William Malm

Patented Apr. 22, 1924.

1,491,017

UNITED STATES PATENT OFFICE.

WILLIAM MALM, OF NEW ORLEANS, LOUISIANA.

MOTION-PICTURE-FILM FRAMING DEVICE FOR MOTION-PICTURE MACHINES.

Application filed May 15, 1922. Serial No. 561,046.

*To all whom it may concern:*

Be it known that I, WILLIAM MALM, a citizen of the United States, and a resident of New Orleans, in the parish of Orleans and State of Louisiana, have invented certain new and useful Improvements in Motion-Picture-Film Framing Devices for Motion-Picture Machines, of which the following is a specification.

This invention relates to the automatic means for effecting adjustment whereby the pictures on a motion picture film are brought into proper registry with an aperture in a motion picture machine.

In motion picture machines, as is well known, the motion picture film is passed across the aperture of the projector, through which the projecting light passes. The successive pictures on the film are brought in front of the aperture with suitable rapidity and the film is moved intermittently, permitting a rest of each picture in front of the aperture for a short interval. The film is ordinarily driven by means of a sprocket wheel, the sprocket teeth entering in the holes in the margin of the film.

In order to secure the best results, each picture as it comes into the line of projection should register accurately in "frame" with the aperture. In threading the film, it may be secured to the driving sprocket in such relation that the pictures will register as nearly as possible in "frame" with the aperture, and when it is impossible to "frame" the picture while threading in the film, the necessary adjustment is at present accomplished by means of hand-operated lever which by means of a series of mechanical devices, moves the film driving sprocket wheel in such a manner as will bring the motion picture film to or from the aperture, such as is necessary for the accurate "framing" of said picture.

The object of present invention is to provide means whereby relative adjustments of the film and aperture may be secured automatically with any degree of accuracy while the machine is running.

It is a further object of the invention to provide a mechanism of simple durable construction, which will afford ample driving power when the driving connection is in operation, but will be easily and quickly released upon the cessation of the flow of electric current through the then operating electro-magnet.

A further object of this invention is to provide photo-electrically controlled electrical devices for operating said electro-magnets.

Other and ancillary objects of the invention will appear hereinafter.

Figures 6, 7:
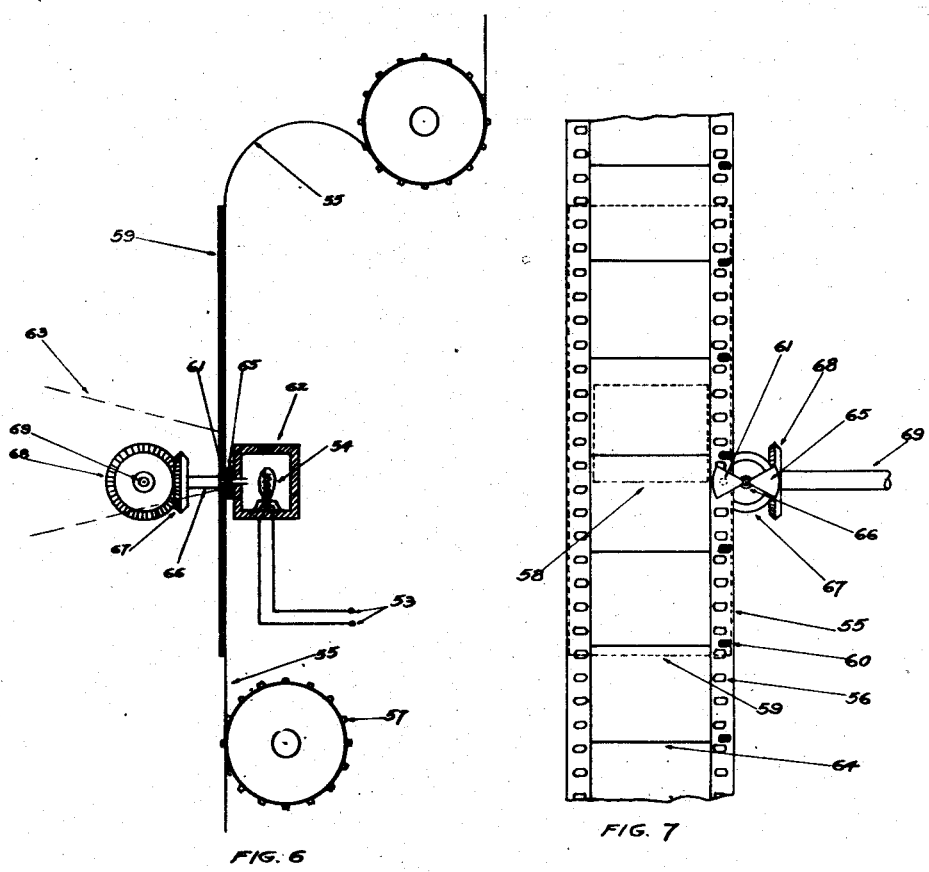

In the accompanying drawings which illustrate the invention, Fig. 1 is a top plan view of the apparatus embodying part of the invention such as is applicable to the present "vertical framer" types of motion picture machines, with so much of a motion picture machine as is necessary to show its application thereto; Fig. 2 is an elevation of the rack (10) in Fig. 1, showing means for operating snap switch for reversing framing carriage which is shown in Fig. 1, or reversing direction of rotation of framing "drum" (10ª) shown in Fig. 3; Fig. 3 is a top plan view showing such modification of Fig. 1 as is necessary to make the invention applicable to the present rotational-framer types of motion picture machines; Fig. 4 is an end view of Fig. 3 excluding main frame of machine shown in said Fig. 3; Fig. 5 is a diagram showing details of electrical circuits controlling electro-magnets shown in Fig. 1; Fig. 6 is a side view of the film passing over aperture plate illustrated in Fig. 7, with detail of the photo-electric or selenium cell shown in Fig. 5, showing how the energy utilized in this invention is transmitted from the projecting light to the electrical circuit which controls electro-magnets shown in Fig. 1; Fig. 7 is a view of Fig. 6 from the projection end of the machine, eliminating for simplicity the photo-electric or selenium cell shown in said Fig. 6.

Referring to the drawings, Figs. 1 to 7, inclusively, 1 is the sprocket wheel fixed on star wheel shaft 2, which drives the film 55 past the aperture in plate 59 by an intermittent movement imparted to it by the well known Geneva star wheel 3 and cam 4. Fly wheel 5 is fixed on cam shaft 6 which is driven from the main driving mechanism by gear 7. The parts 1 to 7, inclusively, which are supported by frame 8 comprise the "framing carriage" of the "vertical framer" types of machines, and "frames" the picture by moving vertically along guide 9 fixed on main frame of machine, and is balanced by racks 10 and 11 fixed on frame 8, which run vertically in guides fixed on main frame of machine. For simplicity, the latter mentioned guides are not shown in the drawings.

14 is a bevel gear fixed on crank shaft 15 of main driving mechanism of machine, which drives bevel gear 16 having round shank 17 and fixed on square shaft 18. Shaft 19 with square socket 20 at end is fixed in disc 21, and rotates loosely in gears 22 and 23. Power is transmitted to gears 24 and 25 by means of friction between discs 21 and 26, or discs 21 and 27, respectively. Friction discs 27 and 26 are fixed on gears 22 and 23, respectively. 28 and 29 are shafts fixed in gears 24 and 25, respectively. 30 is a groove in shaft 19 which permits projecting bearing 31 to shift said shaft 19, when attracted by electro-magnet 32 or 33. 34 is a guide fixed on main frame of machine in which projecting bearing 31 slides horizontally.

Bracket 35, fixed on main frame of machine, supports sliding clamp-rod 36; fixed pins 37 and 38 of levers 39 and 40, respectively. 41 is a block in which lever 39 slides and is attached loosely by pin 42, fixed to sliding-clamp-rod 36. 44 is a loose pin connecting levers 39 and 40. Spring 43 clamps rod 36 on rack 11, thereby preventing any "slipping" of the framing carriage, due to gravity or vibration while the machine is running. Said spring 43 simultaneously (by means of levers 39 and 40 bearing against flanges 45 and 46, respectively) holds disc 21, shaft 19, and projecting bearing 31 in neutral position when no electric current is passing through electro-magnet 32 or 33.

Snap switch 47 is a single pole double throw switch, which when snapped by contact between projection 48 and lever 50, or projection 49 and lever 50, switches the flow of electric current of secondary circuit 51 from circuit 51$^a$ to circuit 51$^b$, or vice versa. 52 is a relay which closes secondary circuit 51, simultaneously with the closing of primary circuit 53 by the action of projecting light 63 upon photo-electric or selenium cell 54. 55 is a motion picture film having perforations 56 which mesh with sprocket teeth 57, causing said film 55 to pass intermittently over aperture 58 in aperture plate 59. 60 is a small area of film 55, covered or inlaid with any suitable translucent or opaque substance, which when registering accurately with hole 61 in aperture plate 59, prevents the admission of projecting light 63 into cell container 62.

65 is a revolving shutter fixed on shaft 66 of bevel gear 67, driven from main driving mechanism of machine by means of bevel gear 68 fixed on shaft 69. Said shutter 65 synchronizes with the intermitent movement of film 55, inasmuch as it covers the hole 61 while film is in motion, and uncovers said hole 61 when film is at rest. The object of such shutter 65 is to cover hole 61 during interval at which said hole 61 is not covered by any of the translucent or opaque areas 60 of film 55, except when said film 55 is not "in frame" with aperture 58.

1$^a$ is the sprocket wheel fixed on star wheel shaft 2$^a$, which drives the film 55 past the aperture 58 in plate 59, by an intermittent movement imparted to it by the star wheel 3$^a$ and cam 4$^a$. Fly wheel 5$^a$ is fixed on shaft 6$^a$ and is driven from the main driving mechanism by the gear 7$^a$ fixed on said shaft 6$^a$.

Cam 4$^a$ is fixed on shaft 8$^a$ and driven by gear 9$^a$. The parts 1$^a$ to 9$^a$, inclusively, which are supported by drum 10$^a$ comprise the "framing carriage" of the "rotary framer" type of machine, and "frames" the picture film by revolving the drum 10$^a$ around common axes of shafts 2$^a$ and 6$^a$. Main frame 11$^a$ of machine supports drum 10$^a$ and all appurtenances thereto. Spring clamp 12$^a$, fixed on main frame of machine by pin 13$^a$, clamps drum 10$^a$ thereby preventing any "slipping" of the framing carriage due to vibration while machine is running. Clamp-rod 14$^a$ corresponds to clamp-rod 36 and is attached to spring clamp 12$^a$ by means of loose pin 15$^a$. Helical gears 16$^a$ and 17$^a$ fixed on drum 10$^a$ correspond to gears on racks 10 and 11, respectively, and are driven by worm gears 18$^a$ and 19$^a$, respectively. Gears 20$^a$ and 21$^a$ correspond to gears 24 and 25, respectively. Shaft 22$^a$ is fixed in worm gear 19$^a$ and 20$^a$. Shaft 23$^a$ is fixed in worm gear 18$^a$ and gear 21$^a$.

While the invention has been illustrated in what is considered its best application, it may have other embodiments without departing from its spirit. It is not therefore limited to the structures shown in the drawings.

When the motion picture on film 55 is "in frame" with aperture 58, translucent or opaque area 60 covers hole 61 in aperture plate 59 during the rest period of each successive picture.

When the picture is not "in frame", the translucent or opaque area does not cover hole 61 in aperture plate 59 during the period of rest of said picture.

Revolving shutter 65 covers hole 61 during period of motion of each successive picture, whether or not picture is in frame, so that no light 63 might enter within photo-electric or selenium cell 54, except when picture is not "in frame", thereby permitting the use of very sensitive photo-electric or selenium cells.

Let us assume that the picture becomes

"misframed" when the device is set as shown in Figure (1), with circuit 51ᵃ partly closed by snap switch 47 as shown in Figure (5); then the "framing" is accomplished as follows:

Projecting light 63 passes through hole 61 into photo-electric or selenium cell 54 thereby actuating relay 52 which closes circuit 51ᵃ and charges electro-magnet 32. Sliding bearing 31 is attracted by electro-magnet 32 and throws revolving disc 21 against disc 27, thereby actuating gears 22 and 25 which in turn raises frame 8 as is now done manually. While disc 21 is thrown against disc 27, sliding clamp rod 36 is released from rack 11 by contact between flange 46 and lever 40.

Frame 8 continues to move upward until projection 48 on rack 10 comes in contact with lever 50 which snaps switch 47 thereby opening circuit 51ᵃ and closing circuit 51ᵇ. This action discharges electro-magnet 32, and charges electro-magnet 33. Sliding bearing 31 is attracted by electro-magnet 33 and throws revolving disc 21 against disc 26, thereby actuating gears 23 and 24 which in turn lower frame 8. While disc 21 bears against disc 26, sliding clamp rod 36 is released from rack 11 by contact between flange 45 and lever 39. The reverse motion just described is the same as is now done manually when an extremity of the "framing" range is reached.

Frame 8 continues to move downward until projection 49 on rack ten comes in contact with lever 50 which snaps switch 47 thereby opening circuit 51ᵇ and closing circuit 51ᵃ. This action discharges electro-magnet 33 and again charges electro-magnet 32 repeating the operation just described. The operation continues until the translucent or opaque area 60 again covers hole 61 in aperture plate 59, thereby "framing" the picture.

The operation of this device on "rotational framer" type of machine is the same as the "vertical framer" type of machines, except that it "frames" the picture by revolving the framing carriage or "drum" instead of imparting a vertical movement to the said carriage.

What I claim as new and desired to secure by Letters Patent, is:

1. In a motion picture machine, the combination with a film sprocket, of an adjustable connection between said sprocket and the driving means of the same, comprising a pair of bevel gears, one having a square shaft, said square shaft fitting in a like socket, said socket being a part of a sliding shaft having a friction disc fixed on said sliding shaft, said friction disc to make contact with either of a pair of friction discs each of which have a gear attached, thereby rotating said attached gears which by means of such gears as will impart to the framing carriage of said machine, a vertical or rotational movement such as is necessary for said carriage to "frame" or bring a motion picture film in proper registry with the aperture of said machine.

2. In a motion picture machine, the combination with a film sprocket, of means for controlling an adjustable connection between said sprocket and the driving means of the same, comprising a projecting bearing sliding in a guide between two electromagnets, and having a ridge fitting in a groove at one end of aforementioned sliding shaft; a pair of loosely connected synchronizing levers, each attached loosely to a bracket by pins fixed on said bracket, said levers being attached by means of a swivel block to a rod having a suitable clamp at one end; a pair of flanges fixed on said sliding shaft at suitable points for making contact with said pair of levers.

3. In a motion picture machine, the combination with a film sprocket, of means for automatically charging or discharging a pair of electro-magnets which affect the controlling means of an adjustable connection between said sprocket and the driving means of the same, comprising a suitably shaped hole of ample size in the aperture plate of said machine, and a suitable revolving shutter driven from the main driving mechanism of said machine by a pair of bevel gears, and located at a point between the source of projecting light and a suitably shaped hole in wall of an enclosure containing a photo-electric or selenium cell, said photo-electric or selenium cell electrically connected in series with an electric relay in a primary electric circuit; a single pole double throw electric snap switch, mounted on main frame of said machine at a point where it may be actuated by a projection or projections located on framing carriage of said machine, said switch so located in a secondary circuit of said relay, that when actuated, it will switch the flow of electric current from one to the other of the aforementioned pair of electro-magnets, such as is necessary for the framing of the motion picture film hereinafter described, by the framing carriage of said machine.

4. In a motion picture machine, the combination with the picture on a motion picture film, of means for controlling the action of the projecting light on the framing means of said picture, comprising a translucent or opaque substance of suitable size and shape, attached to or forming part of said picture, and located at a point on either side of picture and on or near the same axis of horizontal frame line of said picture; and a suitable revolving shutter driven from the main driving mechanism of said machine by a pair of bevel gears, and located at a point between the source of projecting light and a suitably shaped hole in wall of an enclosure containing a photoelectric or selenium cell.

Signed at New Orleans in the parish of Orleans and State of Louisiana this 24th day of September, A. D., 1921.

WILLIAM MALM.

Witnesses:
E. M. CARRIER,
H. B. ATWOOD.